(12) United States Patent
Basso et al.

(10) Patent No.: US 9,571,292 B2
(45) Date of Patent: *Feb. 14, 2017

(54) MULTICAST PACKET ROUTING VIA CROSSBAR BYPASS PATHS

(71) Applicant: International Business Machines Corporation, Armonk, NY (US)

(72) Inventors: Claude Basso, Nice (FR); Nikolaos Chrysos, Thalwil (CH); Cyriel J. Minkenberg, Gutenswil (CH); Mark L. Rudquist, Rochester, MN (US); David A. Shedivy, Rochester, MN (US); Brian T. Vanderpool, Byron, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

This patent is subject to a terminal disclaimer.

(21) Appl. No.: 14/170,231

(22) Filed: Jan. 31, 2014

(65) Prior Publication Data
US 2015/0207638 A1    Jul. 23, 2015

Related U.S. Application Data

(63) Continuation of application No. 14/160,222, filed on Jan. 21, 2014.

(51) Int. Cl.
*H04L 12/50*    (2006.01)
*H04L 12/18*    (2006.01)
(Continued)

(52) U.S. Cl.
CPC ............... *H04L 12/18* (2013.01); *H04L 47/62* (2013.01); *H04L 49/101* (2013.01); *H04L 49/201* (2013.01)

(58) Field of Classification Search
CPC ....... H04L 1/1835; H04L 1/189; H04B 7/1885
(Continued)

(56) References Cited

U.S. PATENT DOCUMENTS 6,870,844 B2    3/2005    Tuck et al.
7,103,058 B2    9/2006    Rashid et al.
(Continued)

OTHER PUBLICATIONS

Office Action dated Sep. 2, 2016, U.S. Appl. No. 14/160,222, filed Jan. 21, 2014.
(Continued)

*Primary Examiner* — Marcus R Smith
*Assistant Examiner* — Dewanda Samuel
(74) *Attorney, Agent, or Firm* — Patterson + Sheridan, LLP (57) ABSTRACT

An approach is described for routing data to a plurality of output terminals via a integrated switch router including a crossbar switch having both a crossbar and a plurality of crossbar bypass lines. Whereas the crossbar may connect each input of the crossbar switch to each output of the crossbar switch, each of the plurality of crossbar bypass lines may connect a single input of the crossbar switch to a corresponding single output of the crossbar switch. According to such approach, a replicated copy of a multicast packet may be forwarded to an output terminal via a crossbar bypass line in parallel with other data forwarded via the crossbar, thus increasing integrated switch router bandwidth.

12 Claims, 7 Drawing Sheets

(51) Int. Cl.
  *H04L 12/933* (2013.01)
  *H04L 12/863* (2013.01)
  *H04L 12/931* (2013.01)

(58) Field of Classification Search
  USPC .................. 370/381, 395.71, 395.72, 402
  See application file for complete search history.

(56) References Cited

U.S. PATENT DOCUMENTS

| | | |
|---|---|---|
| 7,123,611 B2 | 10/2006 | Davis et al. |
| 7,519,054 B2 | 4/2009 | Varma |
| 7,715,419 B2* | 5/2010 | Tatar .................. H04L 49/1546 370/230 |
| 7,848,341 B2 | 12/2010 | Benner et al. |
| 2002/0064156 A1* | 5/2002 | Minkenberg .................. 370/392 |
| 2002/0075871 A1* | 6/2002 | Blanc .................. H04L 49/201 370/390 |
| 2004/0008716 A1* | 1/2004 | Stiliadis ........................ 370/429 |
| 2008/0117913 A1 | 5/2008 | Tatar et al. |
| 2011/0170542 A1* | 7/2011 | Liu et al. ........................ 370/390 |
| 2011/0258641 A1* | 10/2011 | Armstrong ............ G06F 13/385 719/327 |
| 2011/0261815 A1* | 10/2011 | Armstrong et al. .......... 370/390 |
| 2013/0142066 A1 | 6/2013 | Yamaguchi et al. |
| 2013/0242985 A1 | 9/2013 | Basso et al. |

OTHER PUBLICATIONS

Appendix P, List of IBM Patents/Patent Applications Treated As Related.

\* cited by examiner

MULTICAST PACKET ROUTING VIA CROSSBAR BYPASS PATHS

CROSS-REFERENCE TO RELATED APPLICATIONS

This application is a continuation of co-pending U.S. patent application Ser. No. 14/160,222, filed Jan. 21, 2014. The aforementioned related patent application is herein incorporated by reference in its entirety.

BACKGROUND

The various embodiments described herein generally relate to the field of multicast traffic engineering.

Efficient support of multicast traffic by switches and routers is important in modern networks. Applications may include, for example, content broadcasting, ticket distribution in financial markets, disaster recovery, and distributed multimedia systems. A switch may facilitate data packet transmission in a network by replicating a multicast packet from a single input terminal and sending the replicated packets, referred to as a multicast flow, to multiple destinations. While a conventional switching fabric may facilitate transmission of replicated copies of a multicast packet within a switch, such switching fabric, without more, may be susceptible to bandwidth overhead and head-of-line blocking, which may occur when multiple input queues within a switch attempt to transmit multicast packets to a single destination.

BRIEF SUMMARY

The various embodiments described herein provide an integrated switch router apparatus including a broadcast network, a crossbar switch having a crossbar and a plurality of crossbar bypass lines, and a plurality of multicast replication buffers communicatively connected to the broadcast network. Each of the plurality of multicast replication buffers may respectively correspond to one of the plurality of crossbar bypass lines. The apparatus further may include a broadcast arbiter. The broadcast arbiter may be configured to receive a multicast packet from an input terminal, to forward a payload of the multicast packet through the broadcast network, and to forward each header of the multicast packet through the broadcast network. The apparatus further may include a crossbar arbiter. The crossbar arbiter may be configured to forward replicated copies of the multicast packet through the crossbar switch to a plurality of output terminals.

In one embodiment of the apparatus, the broadcast arbiter may be configured to forward the payload of the multicast packet through the broadcast network by facilitating a broadcast of the payload to a payload queue of each of the plurality of multicast replication buffers. Additionally, the broadcast arbiter may be configured to forward each header of the multicast packet through the broadcast network by performing steps for each header of the multicast packet. Specifically, upon determining that a header queue of a multicast replication buffer corresponding to a crossbar bypass line among the plurality of crossbar bypass lines having a path to a destination output terminal designated in the header is available, the broadcast arbiter may facilitate transmission of the header to the corresponding multicast replication buffer and may store the header in the header queue of the corresponding multicast replication buffer. Upon determining that a header queue of a multicast replication buffer corresponding to a crossbar bypass line among the plurality of crossbar bypass lines having a path to the destination output terminal is not available, the broadcast arbiter may facilitate transmission of the header to a multicast replication buffer among the plurality of multicast replication buffers having a header queue with the lowest backlog and may store the header in the header queue with the lowest backlog.

In a further embodiment, the crossbar arbiter may be configured to forward replicated copies of the multicast packet to the plurality of output terminals by performing steps for each header of the multicast packet. Specifically, the crossbar arbiter may facilitate replication of a copy of the multicast packet at the multicast replication buffer at which the header is stored. Upon determining that the multicast replication buffer at which the header is stored corresponds to a crossbar bypass line among the plurality of crossbar bypass lines having a path to a destination output terminal designated in the header, the crossbar arbiter may facilitate transmission of the replicated copy to the destination output terminal via the crossbar bypass line. Upon determining that that the multicast replication buffer at which the header is stored does not correspond to a crossbar bypass line among the plurality of crossbar bypass lines having a path to the destination output terminal, the crossbar arbiter may facilitate transmission of the replicated copy to the destination output terminal via the crossbar.

In a further embodiment, the crossbar of the crossbar switch may connect each input among a plurality of inputs of the crossbar switch to each output among a plurality of inputs of the crossbar switch, and each of the plurality of crossbar bypass lines may connect a single input among the plurality of inputs to a single output among the plurality of outputs. Additionally, the crossbar arbiter may be configured to forward data via the crossbar in parallel with data forwarded via one or more of the plurality of crossbar bypass lines. Moreover, each of the plurality of multicast replication buffers may be located at an input among the plurality of inputs of the crossbar switch, and at most one crossbar bypass line among the plurality of crossbar bypass lines may correspond to each of the plurality of inputs. Furthermore, at most one crossbar bypass line among the plurality of crossbar bypass lines may have a path to each of the plurality of outputs of the crossbar switch. In a further embodiment, the crossbar arbiter may include a crossbar scheduler. The crossbar scheduler may be configured to arbitrate among headers of the multicast packet and other data and to issue scheduler grants that determine forwarding priority at the crossbar switch.

The various embodiments described herein further provide a method of routing data to a plurality of output terminals via an integrated switch router. The integrated switch router may include a broadcast network, a crossbar switch having a crossbar and a plurality of crossbar bypass lines, and a plurality of multicast replication buffers communicatively connected to the broadcast network. Each of the plurality of multicast replication buffers may respectively correspond to one of the plurality of crossbar bypass lines. The method may include receiving a multicast packet from an input terminal. The method further may include forwarding a payload of the multicast packet through the broadcast network and forwarding each header of the multicast packet through the broadcast network. The method further may include forwarding, by operation of one or more processors, replicated copies of the multicast packet through the crossbar switch to the plurality of output terminals.

In one embodiment of the method, forwarding the payload of the multicast packet through the broadcast network may include facilitating a broadcast of the payload to a payload queue of each of the plurality of multicast replication buffers. Additionally, forwarding each header of the multicast packet through the broadcast network may include performing steps for each header of the multicast packet. Specifically, upon determining that a header queue of a multicast replication buffer corresponding to a crossbar bypass line among the plurality of crossbar bypass lines having a path to a destination output terminal designated in the header is available, forwarding the header may include facilitating transmission of the header to the corresponding multicast replication buffer and storing the header in the header queue of the corresponding multicast replication buffer. Upon determining that a header queue of a multicast replication buffer corresponding to a crossbar bypass line among the plurality of crossbar bypass lines having a path to the destination output terminal is not available, forwarding the header may include facilitating transmission of the header to a multicast replication buffer among the plurality of multicast replication buffers having a header queue with the lowest backlog and storing the header in the header queue with the lowest backlog.

In a further embodiment, forwarding replicated copies of the multicast packet through the crossbar switch to the plurality of output terminals may include performing steps for each header of the multicast packet. Specifically, forwarding a replicated copy with respect to the header may include facilitating replication of a copy of the multicast packet at the multicast replication buffer at which the header is stored. Upon determining that the multicast replication buffer at which the header is stored corresponds to a crossbar bypass line among the plurality of crossbar bypass lines having a path to a destination output terminal designated in the header, forwarding a replicated copy with respect to the header may include facilitating transmission of the replicated copy to the destination output terminal via the crossbar bypass line. Upon determining that that the multicast replication buffer at which the header is stored does not correspond to a crossbar bypass line among the plurality of crossbar bypass lines having a path to the destination output terminal, forwarding a replicated copy with respect to the header may include facilitating transmission of the replicated copy to the destination output terminal via the crossbar.

The various embodiments described herein further provide a computer readable storage medium storing an application, which, when executed on a processor, performs an operation of routing data to a plurality of output terminals via an integrated switch router. The steps of such operation may reflect one or more steps of the above method.

BRIEF DESCRIPTION OF SEVERAL VIEWS OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

The various embodiments described herein are directed to techniques for forwarding multicast data at an integrated switch router in a switch unit. The set of destinations of a multicast packet is generally referred to as a fanout set. A multicast flow may refer to the stream of packets that originate from the same input and target the same set of destinations. For instance, an incoming packet with a given fanout set f is replicated f times and results in f output packets to be forwarded to the destinations of the fanout set. A sub-flow may refer to each slice of a multicast flow that outputs on a particular destination, i.e., a multicast flow may comprise f sub-flows. According to one embodiment of the present disclosure, replicated copies of a multicast packet having a designated fanout set may be routed via crossbar bypass lines within an integrated switch router to a plurality of destinations designated in the fanout set.

According to embodiments of the present disclosure, an integrated switch router is provided that may interconnect a number of terminal nodes in a switch unit via a crossbar switch. The integrated switch router may include links connected to intermediate network nodes (e.g., switching elements), or to additional integrated switch routers. Terminal nodes may function as sources of or sinks for network traffic and may be one or more computing devices, such as servers or storage devices. The switch unit may include a plurality of terminals, which for a given data packet transmission may serve as input terminals or output terminals. A multicast packet may be located at an input terminal among the input terminals. The multicast packet may include headers designating respective destinations of a fanout set. Each header of the multicast packet may include routing and control information required to properly forward a copy of the multicast packet to the designated destination. Each output terminal may be a respective destination designated in the fanout set or may serve as a respective intermediate destination to a remote output terminal designated in the fanout set (i.e., an output terminal beyond the switch unit).

The integrated switch router may include a broadcast network, a plurality of multicast replication buffers, and a plurality of crossbar input buffers. Moreover, the integrated switch router may include a crossbar switch having a crossbar and a plurality of crossbar bypass lines. While the crossbar may connect each input of the crossbar switch to each output of the crossbar switch, each of the plurality of crossbar bypass lines may connect a single input of the crossbar switch to a single output of the crossbar switch. Each of the plurality of multicast replication buffers may be located at a crossbar switch input. Furthermore, each of the plurality of multicast replication buffers may correspond to a single crossbar bypass line having a path to a single crossbar switch output. Additionally, each of the plurality of crossbar input buffers may be located at a crossbar switch input.

The integrated switch router may route a multicast packet having a payload and a plurality of headers from an input terminal of the integrated switch router to the output terminals. A broadcast arbiter of the integrated switch router may forward a payload of the multicast packet through the broadcast network. The broadcast arbiter may forward the payload by facilitating a broadcast of the payload from the input terminal via a payload bus to each of a plurality of multicast replication buffers. In an embodiment, a payload arbiter of the broadcast arbiter may coordinate broadcasting of the payload.

Furthermore, the broadcast arbiter may forward each header of the multicast packet through the broadcast network. The broadcast arbiter may forward each header by facilitating transmission of each header from the input terminal to one of the plurality of multicast replication buffers. Specifically, the broadcast arbiter may select a header of the multicast packet and may determine whether there is a multicast replication buffer corresponding to a crossbar bypass line having a path to the destination output terminal designated in the header. If such a corresponding multicast replication buffer exists, then the broadcast arbiter may facilitate transmission of the header to the corresponding multicast replication buffer and may store the header therein. If such a corresponding multicast replication buffer does not exist, then the broadcast arbiter may facilitate transmission of the header to a multicast replication buffer having a header queue with the lowest backlog and may store the header therein. The broadcast arbiter may select and process each header of the multicast packet according to the above steps. In an embodiment, a header arbiter of the broadcast arbiter may coordinate transmission of each header. According to a further embodiment, the broadcast arbiter may facilitate transmission of traffic not directly associated with the multicast packet (e.g., unicast packet data) to the crossbar input buffers and may store such traffic therein.

A crossbar arbiter of the integrated switch router may forward replicated copies of the multicast packet through the crossbar switch. Specifically, the crossbar arbiter may select a header of the multicast packet. A crossbar scheduler of the crossbar arbiter may coordinate selection of the packet header. The crossbar arbiter may facilitate replication of a copy of the multicast packet at the multicast replication buffer at which the header is stored by directing logic of such multicast replication buffer to combine the header with the payload of the multicast packet. The crossbar arbiter may determine whether the multicast replication buffer at which the header is stored corresponds to a crossbar bypass line having a path to the destination output terminal designated in the selected packet header. If the multicast replication buffer at which the header is stored corresponds to such a crossbar bypass line, then the crossbar arbiter may facilitate transmission of the replicated packet copy to the destination output terminal via the crossbar bypass line. If the multicast replication buffer at which the header is stored does not correspond to such a crossbar bypass line, then the crossbar arbiter may facilitate transmission of the replicated multicast packet copy to the destination output terminal via the crossbar. The crossbar arbiter may select each header of the multicast packet and may replicate a packet copy for each selected header according to the above steps.

According to an embodiment, the crossbar arbiter may forward data via the crossbar in parallel with data forwarded via one or more of the plurality of crossbar bypass lines. For instance, the crossbar arbiter may transmit data stored in a crossbar input buffer via the crossbar in parallel with a replicated copy of a multicast packet transmitted via a crossbar bypass line.

The various embodiments described herein may have various advantages over a conventional crossbar hub. Given N input terminals and N output terminals, there may be N point-to-point crossbar bypass lines from each crossbar switch input to a single crossbar switch output of a crossbar hub according to embodiments of the present disclosure, as opposed to N×N crossbar lines from each crossbar switch input to each crossbar switch output. Accordingly, the cost of the crossbar bypass lines is only $1/N^{th}$ of the baseline crossbar cost, thus reducing bandwidth overhead within the integrated switch router. Further, transmitting a replicated copy of a multicast packet via a crossbar bypass line enables parallel use of crossbar lines for other traffic (e.g., unicast packet data), and thus overall bandwidth within the integrated switch router may be increased. Further still, by selecting a multicast replication buffer at a particular crossbar switch input for transmitting via a crossbar bypass line replicated copies destined for a particular output terminal, a single direct path may be used to transmit replicated copies destined for such output terminal, thus reducing the likelihood of head-of-line blocking. While embodiments provided herein may be described having a N×N arrangement, it should be recognized that embodiments may be extended to different numbers of input terminals and output terminals, i.e., N×M arrangements.

In the following, reference is made to various embodiments of the present disclosure. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium or, alternatively, a computer readable signal medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, particular embodiments describe techniques for routing a multicast packet via an integrated switch router. However, it should be understood that the techniques described herein may be adapted to a variety of purposes in addition to the uses for specifically described herein. Accordingly, references to the specific embodiments are included to be illustrative and not limiting.

Figure 1:
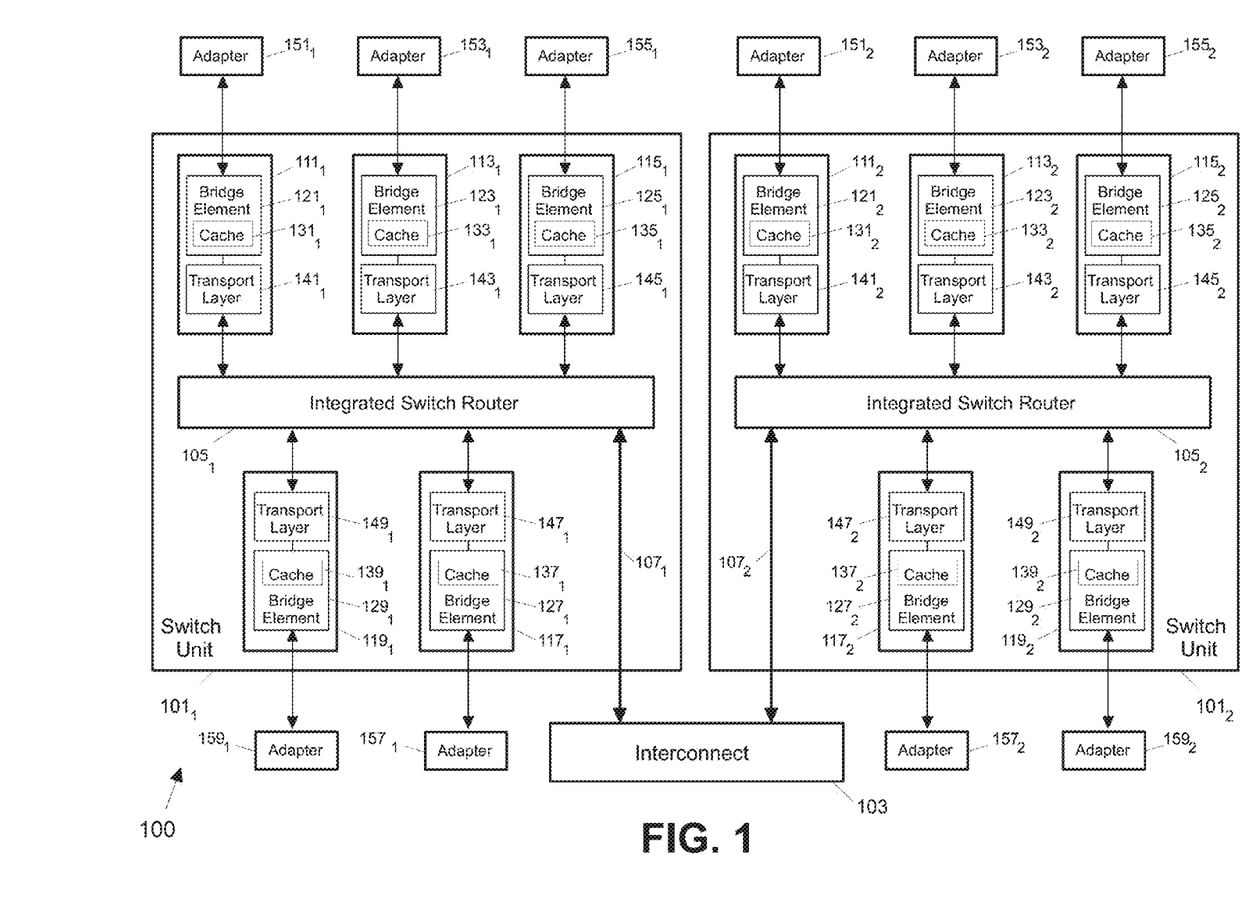
FIG. 1 illustrates a system configured to forward data packets, according to one embodiment of the present disclosure.

FIG. 1 illustrates a system 100 configured to forward data packets, according to one embodiment of the present disclosure. System 100 may include switch units $101_1$ and $101_2$ and interconnect 103. One or both switch units $101_1$ and $101_2$ may be application-specific integrated circuits (ASICs). Each switch unit 101 may include an integrated switch router 105. Each integrated switch router 105 may be connected to interconnect 103 via a high-speed link 107, such as a Chassis-Link (C-Link). Further, each integrated switch router 105 may be connected to terminals 111, 113, 115, 117, and 119. Terminals 111, 113, 115, 117, and 119 respectively may include bridge elements 121, 123, 125, 127, and 129 and transport layer modules 141, 143, 145, 147, and 149. Bridge elements 121, 123, 125, 127, and 129 respectively may include forwarding caches 131, 133, 135, 137, and 139. Additionally, bridge elements 121, 123, 125, 127, and 129 may be connected to adapters 151, 153, 155, 157, and 159, respectively.

Terminals 111, 113, 115, 117, and 119 may interface with adapters 151, 153, 155, 157, and 159, respectively. Adapters 151, 153, 155, 157, and 159 each may be associated with one or more computing systems, e.g., standalone servers or server blade devices. In one embodiment, adapters 151, 153, 155, 157, and 159 may be standalone devices physically distinct from one or more associated computing systems. In another embodiment, one or more of adapters 151, 153, 155, 157, and 159 may be located within an associated computing system. In a further embodiment, one or more of adapters 151, 153, 155, 157, and 159 may include converged adapter virtual bridges (not shown) to facilitate forwarding data to or from a plurality of virtual machines within one or more associated computing systems.

In one embodiment, one or more of adapters 151, 153, 155, 157, and 159 may be Ethernet adapters. In another embodiment, one or more of adapters 151, 153, 155, 157, and 159 may be Peripheral Component Interconnect Express (PCIe) adapters. In a further embodiment, one or more of adapters 151, 153, 155, 157, and 159 may be used to implement a Fibre Channel over Ethernet (FCoE) protocol. Adapters 151, 153, 155, 157, and 159 may send data packets to and may receive data packets from terminals 111, 113, 115, 117, and 119, respectively. Specifically, adapters 151, 153, 155, 157, and 159 may be coupled with corresponding bridge elements 121, 123, 125, 127, and 129. Bridge elements 121, 123, 125, 127, and 129 may be connected to respective transport layer modules 141, 143, 145, 147, and 149. Forwarding caches 131, 133, 135, 137, and 139 may forward data packets to respective transport layer modules 141, 143, 145, 147, and 149, which may convert the forwarded data packets into a format compatible with a transport layer protocol appropriate for integrated switch router 105. Transport layer modules 141, 143, 145, 147, and 149 may send data packets to and may receive data packets from integrated switch router 105.

Although switch units $101_1$ and $101_2$ are illustrated in FIG. 1, interconnect 103 may interface with additional switch units or other integrated circuits (not shown). Further, while each switch unit 101 as illustrated in FIG. 1 includes five terminals 111, 113, 115, 117, 119, a switch unit 101 according to the present disclosure may include any number of terminals. Further still, while each terminal illustrated in FIG. 1 interfaces with a single adapter, additional embodiments may include multiple terminals interfacing with a single adapter or a single terminal interfacing with multiple adapters. While FIG. 1 illustrates a single high speed link 107 between each switch unit 101 and interconnect 103, each integrated switch router 105 may interface with multiple high speed links.

Figure 2:
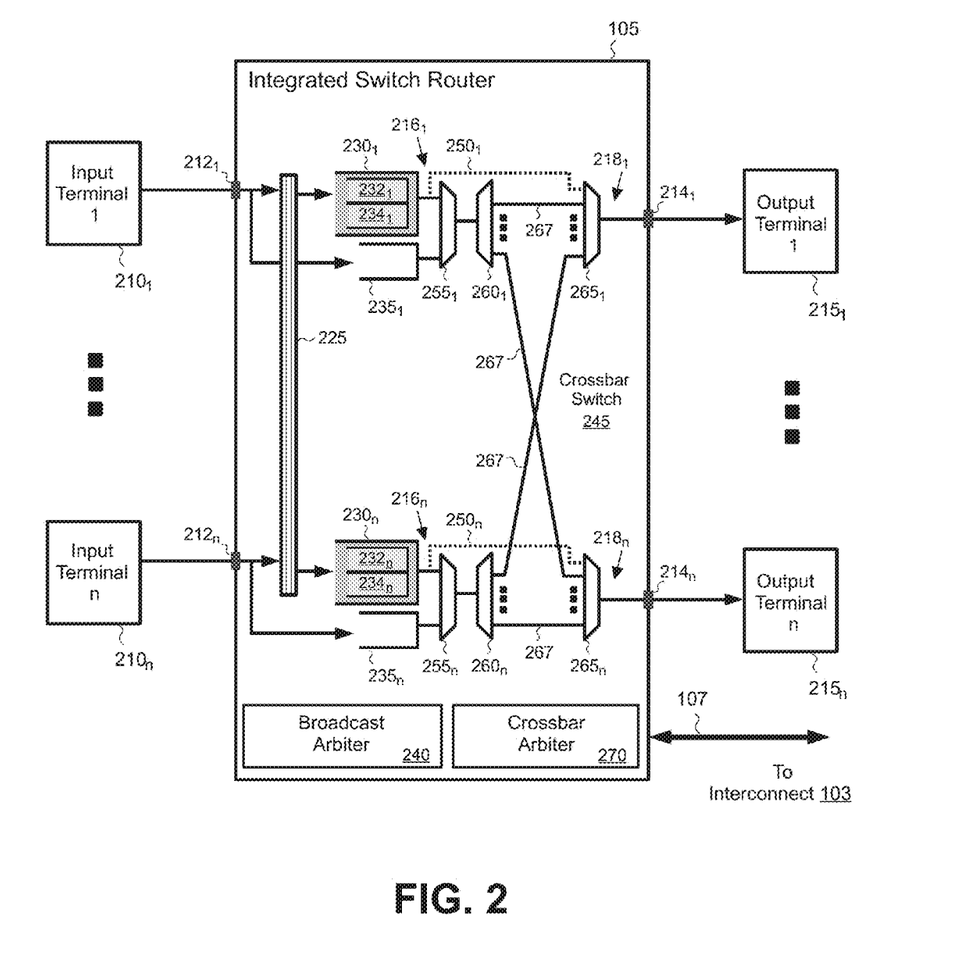
FIG. 2 illustrates a detailed view of an integrated switch router, according to one embodiment of the present disclosure.

FIG. 2 illustrates a detailed view of an integrated switch router 105, according to an embodiment of the present disclosure. As shown, integrated switch router 105 may include a plurality of input ports $212_1$ to $212_n$ communicatively connected to a plurality of output ports $214_1$ to $214_n$ by means of a crossbar switch 245. Integrated switch router 105 may accept data (e.g., in the form of one or more data packets) from one or more terminal nodes (e.g., input terminals $210_1$ to $210_n$) at the input ports 212 and route data to one or more terminal nodes (e.g., output terminals $215_1$ to $215_n$) at the output ports 214. Input terminals $210_1$ to $210_n$ and output terminals $215_1$ to $215_n$ may be representative of terminals 111, 113, 115, 117, and 119 of a switch unit 101. In one embodiment, the input terminals 210 comprise an outgoing or output portion of a transport layer (e.g., transport layer 141, 143, 145), sometimes designated as "TLo," and the output terminals 215 comprise the corresponding input or incoming portions of the same transport layers, sometimes designated as "TLi." In such an embodiment, the integrated switch router 105 enables data flow between bridge elements of a switch unit and/or between bridge elements of a different switch units (i.e., via an integrated switch router, the interconnect, and another integrated switch router)

In one or more embodiments, the integrated switch router 105 may include a plurality of multicast replication buffers $230_1$ to $230_n$ and crossbar input buffers $235_1$ to $235_n$ at inputs $216_1$ to $216_n$ of crossbar switch 245. In the embodiment shown in FIG. 2, each input 216 of the crossbar switch 245 includes an associated input buffer 235 and a multicast replication buffer 230. In some embodiments, each input buffer 235 may include a plurality of queues. In other embodiments, each input buffer 235 may be configured to perform virtual output queuing, sometimes referred to as VOQ.

In one embodiment, the integrated switch router 105 may include a broadcast network 225, which may replicate a packet received at input ports 212 and may store a copy of the packet payload in the multicast replication buffer 230 at one or more crossbar switch inputs 216. In one embodiment, broadcast network 225 may include a payload bus for broadcasting packet payloads from input terminals $210_1$ to $210_n$ to multicast replication buffers $230_1$ to $230_n$ or to crossbar input buffers $235_1$ to $235_n$. Moreover, the integrated switch router 105 may include a header bus (not shown) for transmitting packet headers from input terminals $210_1$ to $210_n$ to multicast replication buffers $230_1$ to $230_n$ or to crossbar input buffers $235_1$ to $235_n$. In some embodiments, the header bus may be separate from the broadcast network 225, and in other embodiments, may be part of the broadcast network 225. Multicast replication buffers $230_1$ to $230_n$ respectively may include header queues $232_1$ to $232_n$ for storing a packet header transmitted via the header bus. As described later, an arbiter element may be used to decide which header queue 232 should receive the header for a corresponding multicast copy. Additionally, multicast replication buffers $230_1$ to $230_n$ respectively may include payload queues $234_1$ to $234_n$ for storing a packet payload broadcasted via the payload bus. In one embodiment, the integrated switch router 105 includes a broadcast arbiter 240 configured to coordinate routing of packet data via broadcast network 225 and to select which port among input ports 212 may have access to use the broadcast network 225.

As shown in FIG. 2, the crossbar switch 245 may include a plurality of demultiplexers $260_1$ to $260_n$, multiplexers $265_1$ to $265_n$, and crossbar lines 267 connecting each demultiplexer 260 to each multiplexer 265. Multiplexers $255_1$ to $255_n$ may select packet data from respective multicast replication buffers $230_1$ to $230_n$ or from respective crossbar input buffers $235_1$ to $235_n$. Each multiplexer 255 may receive data from a respective multicast replication buffer 230 and a respective crossbar input buffer 235 at a respective input 216 of crossbar switch 245 and then may select data from either buffer. In the context of FIG. 2, multiplexer $255_1$ receives data from multicast replication buffer $230_1$ and crossbar input buffer $235_1$ and then selects data from either buffer $230_1$ or buffer $235_1$. Similarly, multiplexer $255_n$ receives data from replication buffer $230_n$ and crossbar input buffer $235_n$ and then selects data from either buffer $230_n$ or buffer $235_n$. Demultiplexers $260_1$ to $260_n$ may accept packet data selected at respective multiplexers $255_1$ to $255_n$ and may be used to select one of a plurality of crossbar lines 267 to transmit such data to multiplexers $265_1$ to $265_n$ at crossbar switch outputs $218_1$ to $218_n$, and ultimately one of the output ports 214.

In one embodiment, the crossbar switch 245 may include a plurality of crossbar bypass lines $250_1$ to $250_n$. Each crossbar bypass line 250 may communicatively connect a multicast replication buffer 230 at a crossbar switch input 216 to a crossbar switch output 218 for multicast traffic. In the embodiment shown in FIG. 2, a crossbar bypass line 250 connects a multicast replication buffer 230 to a multiplexer 265 at a corresponding crossbar switch output 218. Each respective multicast replication buffer 230 may correspond to a respective crossbar bypass line 250. Each crossbar bypass line 250 may transmit packet data to a multiplexer 265, which in turn may transmit the data to an output terminal 215 according to destination information stored in the relevant packet header. Each crossbar bypass line 250 may facilitate transmission of data from a multicast replication buffer 230 to an output terminal 215 without the use of crossbar lines 267. In the context of FIG. 2, crossbar bypass line $250_1$ may receive data from multicast replication buffer $230_1$ and may transmit such data directly to multiplexer $265_1$. Accordingly, multicast replication buffer $230_1$ corresponds to crossbar bypass line $250_1$. Additionally, crossbar bypass line $250_n$ may receive data from multicast replication buffer $230_n$ and may transmit such data directly to multiplexer $265_n$. Accordingly, multicast replication buffer $230_n$ corresponds to crossbar bypass line $250_n$.

Multiplexers $265_1$ to $265_n$ respectively may select packet data either from one of crossbar lines 267 or from a crossbar bypass line 250 to send to respective output terminals $215_1$ to $215_n$. In the context of FIG. 2, multiplexer $265_1$ selects data from either a crossbar line 267 associated with one of demultiplexers $260_1$ to $260_n$ or from crossbar bypass line $250_1$ to send to output terminal $215_1$. In addition, multiplexer $265_n$ selects data from either a crossbar line 267 associated with one of demultiplexers $260_1$ to $260_n$ or from crossbar bypass line $250_n$ to send to output terminal $215_n$.

According to one embodiment of the present disclosure, there is a single crossbar bypass line 250 corresponding to a multicast replication buffer 230 at each crossbar switch input 216, although other configurations having multiple bypass lines may be used. Furthermore, according to an embodiment, there is at most one crossbar bypass line 250 having a path to a multiplexer 265 at each crossbar switch output 218. Thus, according to such embodiments, a crossbar bypass line 250 may connect a multicast replication buffer 230 at each crossbar switch input 216 to one specific multiplexer 265 at a crossbar switch output 218. Additionally, according to an embodiment, each of crossbar bypass lines $250_1$ to $250_n$ corresponds only to one of output terminals $215_1$ to $215_n$ within integrated switch router 105. According to a further embodiment, there are no crossbar bypass lines respectively corresponding to remote output terminals beyond the switch unit 101 in which integrated switch router 105 is located.

In one or more embodiments, the integrated switch router 105 includes a crossbar arbiter 270 configured to coordinate transmission of packet data via the crossbar switch 245, i.e., manage scheduling of packet transfers from inputs 216 to outputs 218. According to an embodiment, crossbar arbiter 270 may facilitate transmission of data from a multicast replication buffer 230 to an output terminal 215 either via the crossbar including demultiplexers $260_1$ to $260_n$ and crossbar lines 267 or via a crossbar bypass line 250.

In operation, an input terminal 210 forwards a multicast packet to the integrated switch router 105, specifying one or more target destinations. The multicast packet may target local destinations (i.e., the destination is located in the same switch unit as integrated switch router 105) or remote destinations (i.e., the destination is located in a different switch unit communicatively connected to the switch unit of integrated switch router 105). Upon injection into the integrated switch router 105, the multicast packet may be copied in the multicast replication buffers 230 at one or more crossbar switch inputs 216 via broadcast network 225. In some embodiments, the input terminal 210 may send additional multicast headers to multicast replication buffers 230, and unique fields of such headers may be injected via control messages into respective replicated multicast packet copies to be forwarded through crossbar switch 245.

Accordingly, embodiments of the present disclosure may effectively multiply the forwarding capacity of a multicast traffic source by a K factor, where K is the number of crossbar inputs that are configured for replication. Embodiments described herein reduce the bandwidth overhead that multicast traffic may steer on neighbor switch ports, which may be common in surrogate or hierarchical multicast forwarding schemes. In such schemes, a port that receives a multicast packet may have to send a new copy of the packet to a number of additional destinations, starting from its neighbors, as well as to more surrogate ports.

According to the embodiments of the disclosure, a port may send a payload of a multicast packet once into the local integrated switch router, and the broadcast arbiter of the integrated switch router may facilitate transmission of the payload to a plurality of inputs of the crossbar switch via the broadcast network. Additionally, the port may send respective headers of the multicast packet into the integrated switch router. The broadcast arbiter may facilitate transmission of the headers to respective inputs of the crossbar switch, and the crossbar arbiter of the integrated switch router may facilitate replication of copies of the multicast packet to be forwarded to local or remote destinations according to information in the respective headers.

The configuration of crossbar bypass lines $250_1$ to $250_n$ in integrated switch router 105 as illustrated in FIG. 2 is an example configuration and is not intended to be limiting. In alternative embodiments of the present disclosure, a crossbar bypass line 250 may connect a multicast replication buffer 230 to a multiplexer 265 in alternative configurations. For instance, in an alternative integrated switch router configuration, crossbar bypass line $250_1$ may receive data from multicast replication buffer $230_1$ and may transmit such data directly to multiplexer $265_n$, and crossbar bypass line $250_n$ may receive data from multicast replication buffer $230_n$ and may transmit such data directly to multiplexer $265_1$.

Figure 3:
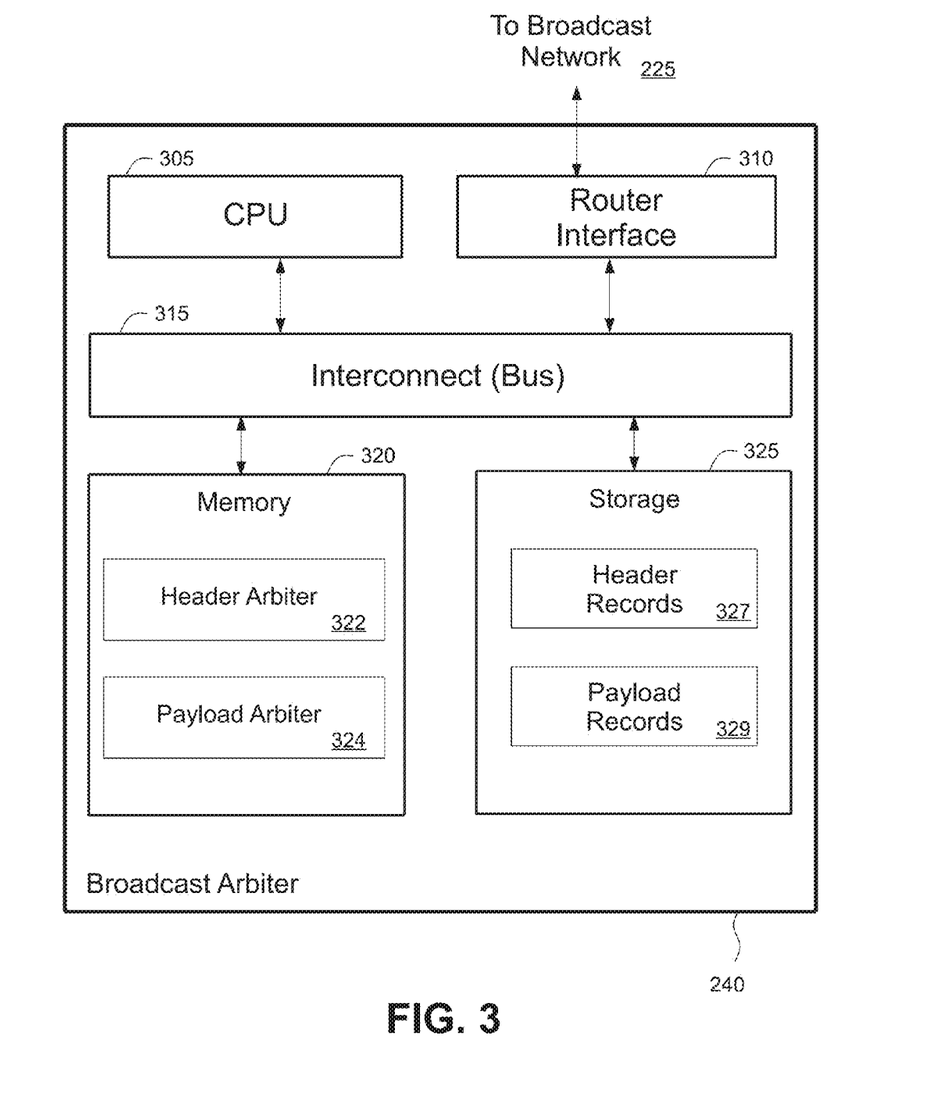
FIG. 3 illustrates a broadcast arbiter of an integrated switch router, according to one embodiment of the present disclosure.

FIG. 3 illustrates details of broadcast arbiter 240, according to an embodiment of the present disclosure. As shown, broadcast arbiter 240 includes, without limitation, a central processing unit (CPU) 305, a router interface 310, an interconnect 315, a memory 320, and storage 325. CPU 305 may retrieve and execute programming instructions stored in memory 320. Similarly, CPU 305 may store and retrieve application data residing in memory 320. CPU 305 is included to be representative of a single CPU, multiple CPUs, a single CPU having multiple processing cores, and the like. Router interface 310 may send communications to and may receive communications from broadcast network 225. Interconnect 315 may facilitate transmission, such as of programming instructions and application data, among CPU 305, router interface 310, memory 320, and storage 325. Memory 320 is generally included to be representative of a random access memory, but one or more other memory types may be used in lieu of or in addition to a random access memory. Storage 325 may be a disk drive storage device. Although shown as a single unit, the storage 325 may be a combination of fixed and/or removable storage devices, such as fixed disc drives, floppy disc drives, tape drives, removable memory cards or optical storage, network attached storage (NAS), or a storage area-network (SAN).

As shown, memory 320 includes a header arbiter 322 and a payload arbiter 324. Header arbiter 322 may coordinate activity associated with a header bus in broadcast network 225. Payload arbiter 324 may coordinate activity associated with a payload bus in broadcast network 225. Further, according to an exemplary embodiment, storage 325 may include header records 327 and payload records 329. Header arbiter 322 may create and use header records 327 to track activity associated with the header bus, while payload arbiter 324 may create and use payload records 329 to track activity associated with the payload bus.

Figure 4:
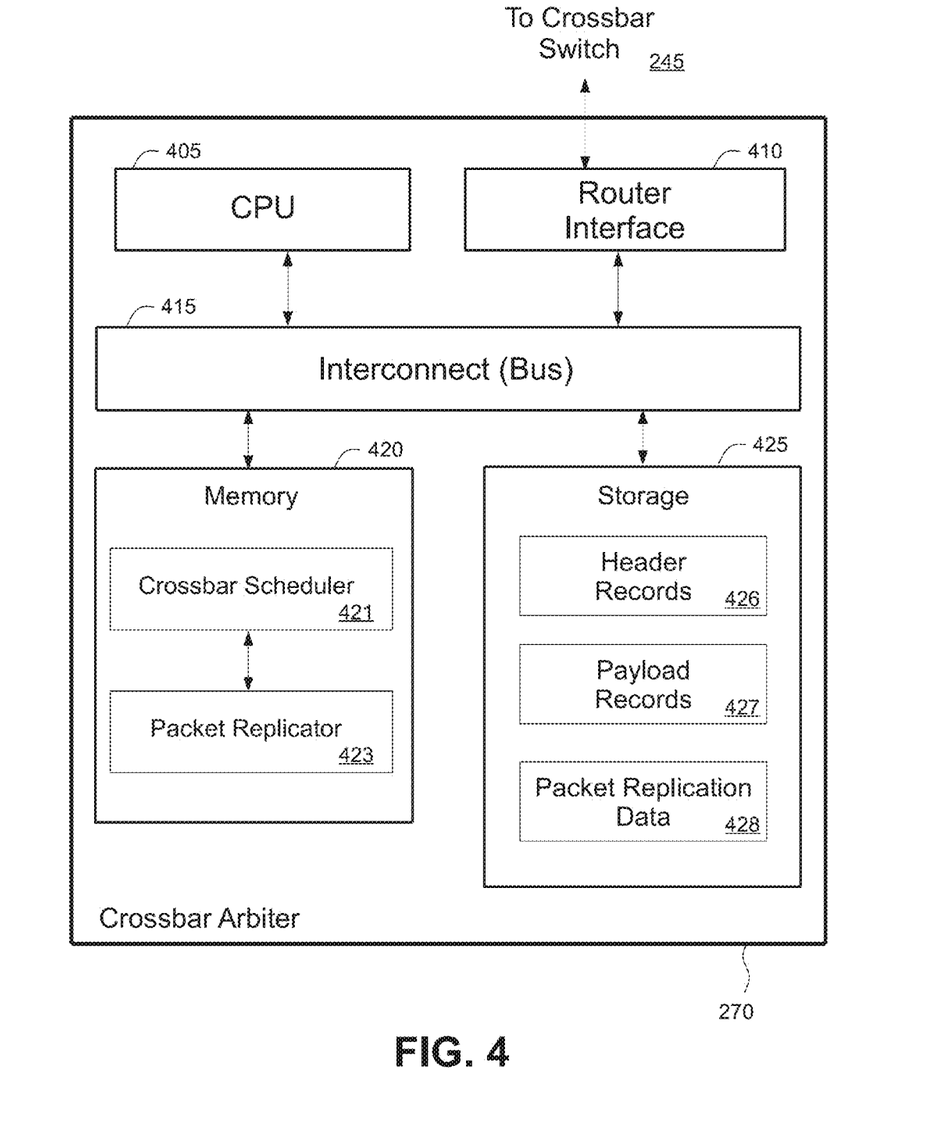
FIG. 4 illustrates a crossbar arbiter of an integrated switch router, according to one embodiment of the present disclosure.

FIG. 4 illustrates details of crossbar arbiter 270, according to an embodiment of the present disclosure. As shown, crossbar arbiter 270 includes, without limitation, a central processing unit (CPU) 405, a router interface 410, an interconnect 415, a memory 420, and storage 425. CPU 405 may retrieve and execute programming instructions stored in memory 420. Similarly, CPU 405 may store and retrieve application data residing in memory 420. CPU 405 is included to be representative of a single CPU, multiple CPUs, a single CPU having multiple processing cores, and the like. In other embodiments, the CPUs may be an ASIC having configurable logic for executing the methods described herein. Router interface 410 may send communications to and may receive communications from crossbar switch 245. Interconnect 415 may facilitate transmission, such as of programming instructions and application data, among CPU 405, router interface 410, memory 420, and storage 425. Memory 420 is generally included to be representative of a random access memory, but one or more other memory types may be used in lieu of or in addition to a random access memory. Storage 425 may be a disk drive storage device. Although shown as a single unit, the storage 425 may be a combination of fixed and/or removable storage devices, such as fixed disc drives, floppy disc drives, tape drives, removable memory cards or optical storage, network attached storage (NAS), or a storage area-network (SAN).

As shown, memory 420 includes a crossbar scheduler 421 and a packet replicator 423. Crossbar scheduler 421 may select packet data for transmission to an output terminal 115. In an embodiment, crossbar scheduler 421 may arbitrate among headers of a multicast packet and other traffic (e.g., unicast packet data) and may issue scheduler grants that determine forwarding priority at crossbar switch 245. Packet replicator 423 may coordinate creation of a multicast packet copy for transmission to an output terminal 215 by facilitating a combination of a selected packet header with the corresponding packet payload. In an embodiment, crossbar scheduler 421 may communicate with packet replicator 423 upon selecting multicast packet data for transmission to an output terminal, and consequently packet replicator 423 may create a replicated copy of such multicast packet. Further, according to an exemplary embodiment, storage 425 may include header records 426 and payload records 427. Packet replicator 423 may analyze header records 426 and payload records 427 during packet replication. Further still, storage 425 may include packet replication data 428 including information regarding replicated packet data (e.g., information regarding replicated copies of a multicast packet).

Figure 5:
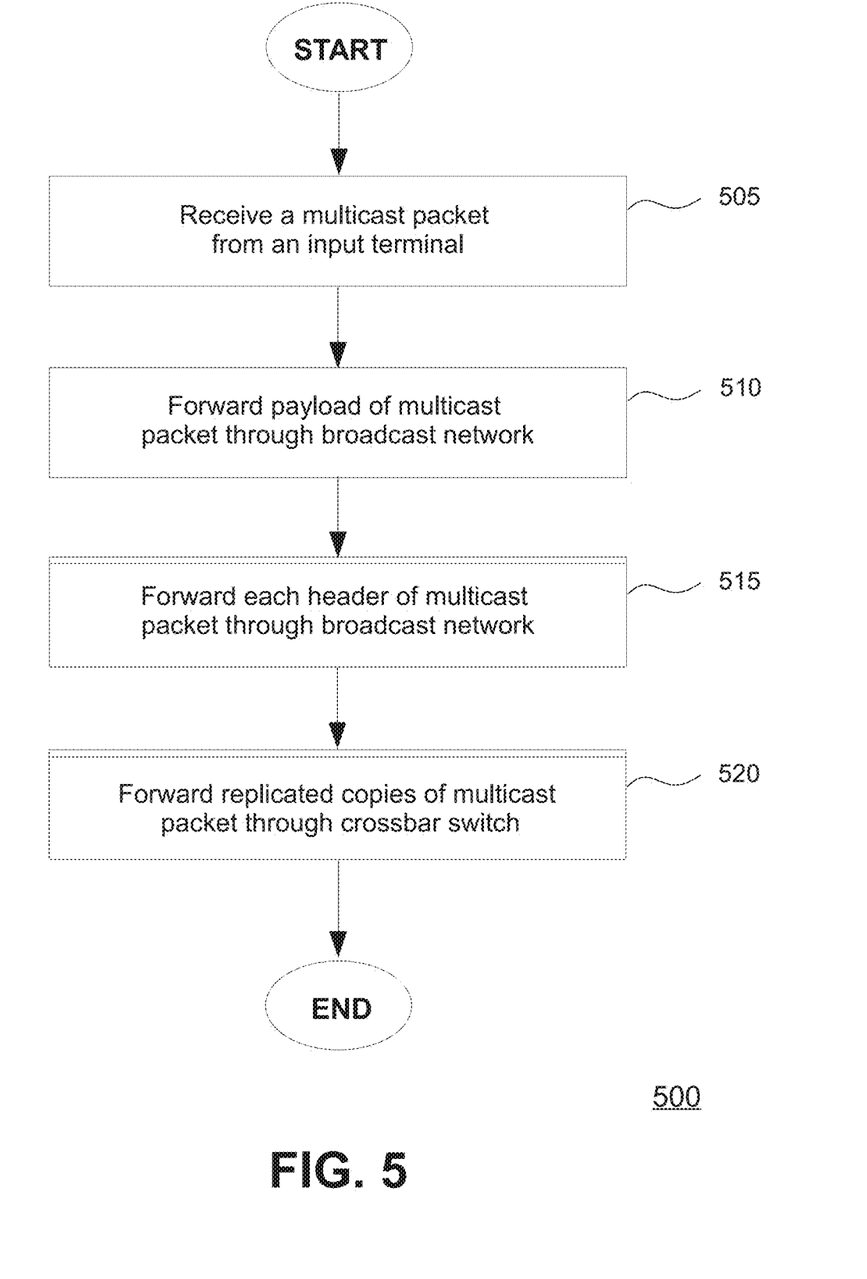
FIG. 5 illustrates a method of routing a multicast packet via an integrated switch router, according to one embodiment of the present disclosure.

FIG. 5 illustrates a method 500 of routing data to a plurality of output terminals (e.g., output terminals $215_1$ to $215_n$) via an integrated switch router (e.g., integrated switch router 105) of a switch unit, according to an embodiment of the present disclosure. The integrated switch router according to the method 500, as well as methods 600 and 700 described herein, may include a crossbar switch (e.g., crossbar switch 245) having a crossbar (e.g., a crossbar including demultiplexers $260_1$ to $260_n$ and crossbar lines 267) and a plurality of crossbar bypass lines (e.g., crossbar bypass lines $250_1$ to $250_n$). The integrated switch router also may include a broadcast network (e.g., broadcast network 225) communicatively connected to a plurality of multicast replication buffers (e.g., multicast replication buffers $230_1$ to $230_n$).

The method 500 may begin at step 505, where the integrated switch router may receive from an input terminal a multicast packet that is to be routed to one or more target destinations. The input terminal may be among a plurality of input terminals (e.g., input terminals $210_1$ to $210_n$). The multicast packet may include headers indicating a fanout set, and each of the plurality of output terminals may be a respective destination designated in the fanout set or may serve as a respective intermediate destination to a remote output terminal designated in the fanout set.

At step 510, the integrated switch router may forward a payload of the multicast packet through the broadcast network of the integrated switch router. According to an embodiment, a broadcast arbiter of the integrated switch router may select the input port (e.g., among input ports 212) at which the multicast packet is received to have access to use the broadcast network 225. Specifically, the broadcast arbiter of the integrated switch router may facilitate a broadcast of the payload of the multicast packet from the input terminal to a payload queue of each multicast replication buffer (e.g., a payload queue 234). Furthermore, upon facilitating the broadcast of the payload to the payload queue of each multicast replication buffer, the broadcast arbiter may store the payload in the respective payload queues. The broadcast arbiter may facilitate the broadcast of the payload to each multicast replication buffer once the input terminal transmits the payload to a payload bus of the broadcast network. According to an embodiment, step 510 may be coordinated by a payload arbiter of the broadcast arbiter (e.g., payload arbiter 324).

At step 515, the integrated switch router may forward each header of the multicast packet through the broadcast network. As further described herein with respect to FIG. 6, the broadcast arbiter may facilitate the forwarding of step 515. According to an embodiment, step 515 may be coordinated by a header arbiter of the broadcast arbiter (e.g., header arbiter 322). The forwarding of the payload of the multicast packet according to step 510 may occur independently and asynchronously with respect to the forwarding of each header of the multicast packet according to step 515.

At step 520, the integrated switch router may forward replicated copies of the multicast packet through the crossbar switch to the plurality of output terminals. As further described herein with respect to FIG. 7, a crossbar arbiter of the integrated switch router (e.g., crossbar arbiter 270) may facilitate the forwarding of step 520.

Figure 6:
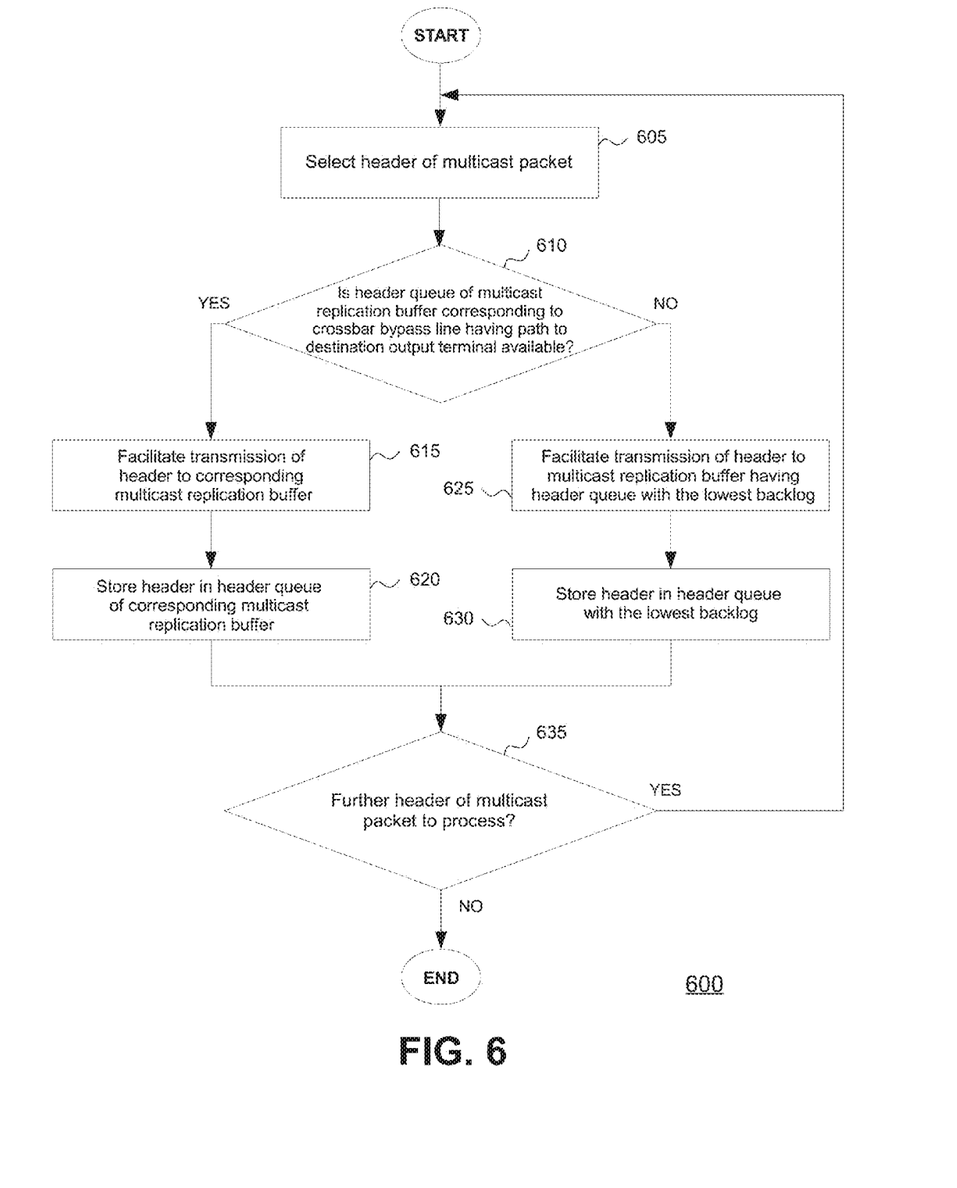
FIG. 6 illustrates a method of forwarding headers of a multicast packet via a broadcast network of an integrated switch router, according to one embodiment of the present disclosure.

FIG. 6 illustrates a method 600 of forwarding a header of a multicast packet through the broadcast network of the integrated switch router, according to an embodiment of the present disclosure. The method 600 provides further detail with respect to step 515 of the method 500. According to the method 600, the broadcast arbiter may facilitate a transmission of each header of the multicast packet to a header queue of a respective multicast replication buffer among the plurality of multicast replication buffers (e.g., a header queue 232). The method 600 may begin at step 605, where the broadcast arbiter may select a header of the multicast packet. The header may include routing information designating a destination output terminal.

At step 610, the broadcast arbiter may analyze a destination output terminal designated in the header of the multicast packet to determine whether a header queue of a multicast replication buffer corresponding to a crossbar bypass line among the plurality of crossbar bypass lines having a path to the destination output terminal is available. Upon determining that a header queue of a multicast replication buffer corresponding to a crossbar bypass line having a path to the destination output terminal is available, at step 615 the broadcast arbiter may facilitate transmission of the header via the broadcast network (e.g., via a header bus) to the corresponding multicast replication buffer, and at step 620 the broadcast arbiter may store the header in the header queue of such buffer. Upon determining that a header queue of a multicast replication buffer corresponding to a crossbar bypass line having a path to the destination output terminal is not available, at step 625 the broadcast arbiter may facilitate transmission of the header via the broadcast network to a multicast replication buffer among the plurality of multicast replication buffers having a header queue with the lowest backlog, and at step 630 the broadcast arbiter may store the header in the header queue with the lowest backlog. At step 635, the broadcast arbiter may determine whether there is a further header of the multicast packet to be processed. Upon determining that there is a further header of the multicast packet to be processed, the method 600 may return to step 605. Upon determining that there are no further headers of the multicast header to be processed, the method 600 may end.

Figure 7:
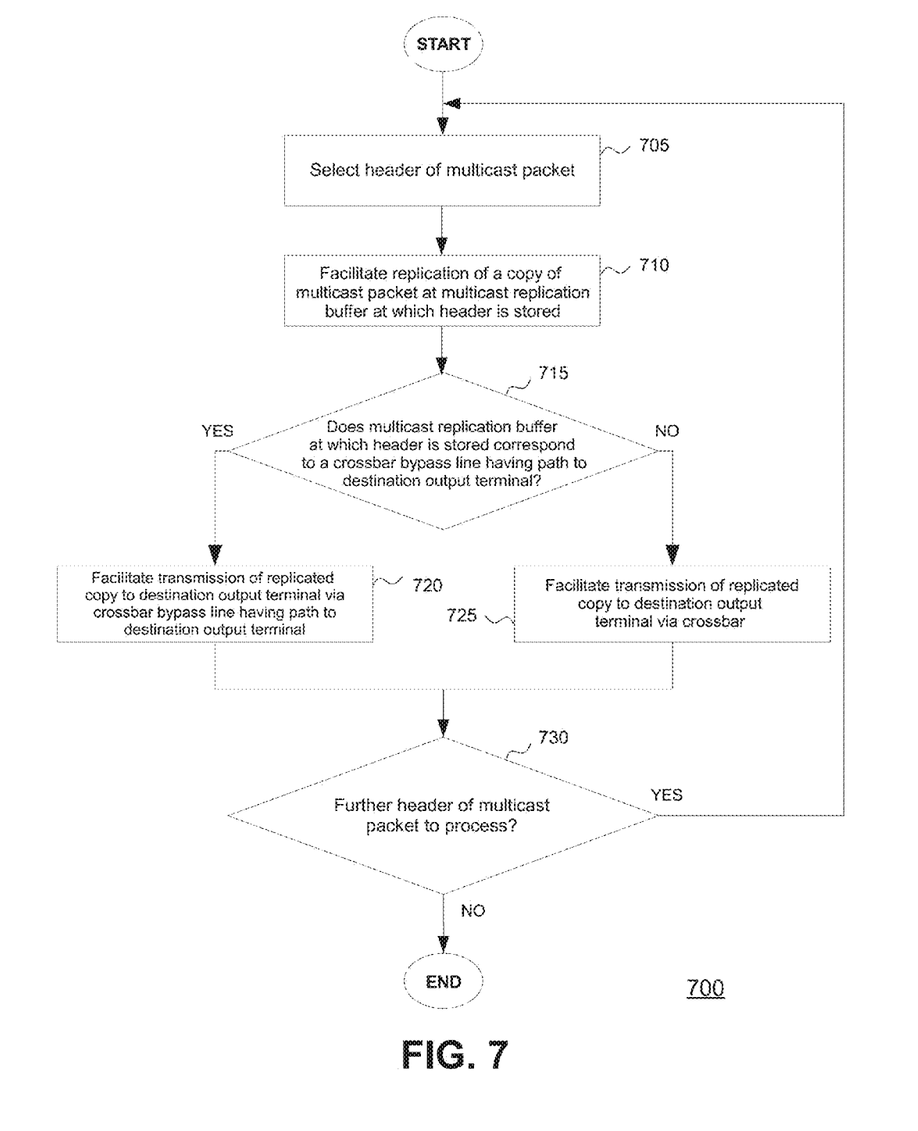
FIG. 7 illustrates a method of creating and transmitting replicated copies of a multicast packet via a crossbar switch of an integrated switch router, according to one embodiment of the present disclosure.

FIG. 7 illustrates a method 700 of forwarding replicated copies of the multicast packet through the crossbar switch, according to one embodiment of the present disclosure. The method 700 provides further detail with respect to step 520 of the method 500. The method 700 may begin at step 705, where the crossbar arbiter of the integrated switch router may select a header of the multicast packet for transmission to a destination output terminal as specified by routing information in the header. According to an embodiment, a crossbar scheduler of the crossbar arbiter (e.g., crossbar scheduler 421) may coordinate selection of the header. In such embodiment, the crossbar scheduler may arbitrate among multicast packet headers and other data and may issue scheduler grants to determine forwarding priority at the crossbar switch. Thus, in such embodiment, headers of the multicast packet do not take automatic precedence over other data at the crossbar switch inputs.

At step 710, the crossbar arbiter may facilitate replication of a copy of the multicast packet at the multicast replication buffer at which the header is stored. According to an embodiment, a packet replicator of the crossbar arbiter (e.g., packet replicator 423) may facilitate the replication by directing logic of the multicast replication buffer to combine the header stored in the header queue of the buffer with the previously-broadcasted payload of the multicast packet stored in the payload queue of the buffer. The logic may inject a control message into the replicated copy including unique fields of the header, such as a field indicating destination information. At step 715, the crossbar arbiter may determine whether the multicast replication buffer at which the header is stored corresponds to a crossbar bypass line having a path to the destination output terminal designated in the header. Upon determining that the multicast replication buffer at which the header is stored corresponds to a crossbar bypass line having a path to the destination output terminal, at step 720 the crossbar arbiter may facilitate transmission of the replicated packet copy to the destination output terminal via the crossbar bypass line having the path to the destination output terminal (e.g., via one of crossbar bypass lines $250_1$ to $250_n$).

Upon determining that the multicast replication buffer at which the selected packet header is stored does not correspond to a crossbar bypass line having a path to the destination output terminal, at step 725 the crossbar arbiter may facilitate transmission of the replicated packet copy to the destination output terminal via the crossbar. Thus, the crossbar transmits the replicated packet copy if a corresponding crossbar bypass line is not available. At step 730, the crossbar arbiter may determine whether there is a further header of the multicast packet to be processed. Upon determining that there is a further header of the multicast packet to be processed, the method 700 may return to step 705. Upon determining that there are no further headers of the multicast header to be processed, the method 700 may end.

According to the various embodiments described herein, an integrated switch router having crossbar bypass lines may reduce bandwidth overhead and may increase overall bandwidth, particularly with respect to multicast packets. Further, such integrated switch router may reduce head-of-line blocking within a crossbar hub. The embodiments of the present disclosure provide an efficient solution for routing multicast packets within and among switch units.

While the foregoing is directed to various embodiments, other and further embodiments may be devised without departing from the basic scope thereof, and the scope thereof is determined by the claims that follow.

What is claimed is:

1. A method of routing data to a plurality of output terminals via an integrated switch router, wherein the integrated switch router comprises a broadcast network, a crossbar switch having a crossbar and a plurality of crossbar bypass lines, and a plurality of multicast replication buffers communicatively connected to the broadcast network, wherein each of the plurality of multicast replication buffers respectively corresponds to one of the plurality of crossbar bypass lines, and wherein the method comprises:
receiving a multicast packet from an input terminal;
forwarding a payload of the multicast packet through the broadcast network;
forwarding each header of the multicast packet through the broadcast network; and
forwarding, by operation of one or more processors, replicated copies of the multicast packet through the crossbar switch to the plurality of output terminals, wherein at least one of the replicated copies of the multicast packet is transmitted from a first multicast replication buffer of the plurality of multicast replication buffers to a first output terminal of the plurality of output terminals via a first crossbar bypass line of the plurality of crossbar bypass lines that corresponds to the first multicast replication buffer.

2. The method of claim 1, wherein forwarding the payload of the multicast packet through the broadcast network comprises facilitating a broadcast of the payload to a payload queue of each of the plurality of multicast replication buffers.

3. The method of claim 1, further comprising:
forwarding data via the crossbar in parallel with a replicated copy of the multicast packet forwarded via a crossbar bypass line among the plurality of crossbar bypass lines.

4. The method of claim 1, wherein the crossbar connects each input among a plurality of inputs of the crossbar switch to each output among a plurality of outputs of the crossbar switch, and wherein each of the plurality of crossbar bypass lines connects a single input among the plurality of inputs to a single output among the plurality of outputs.

5. A method of routing data to a plurality of output terminals via an integrated switch router, wherein the integrated switch router comprises a broadcast network, a crossbar switch having a crossbar and a plurality of crossbar bypass lines, and a plurality of multicast replication buffers communicatively connected to the broadcast network, wherein each of the plurality of multicast replication buffers respectively corresponds to one of the plurality of crossbar bypass lines, and wherein the method comprises:
receiving a multicast packet from an input terminal;
forwarding a payload of the multicast packet through the broadcast network;
forwarding each header of the multicast packet through the broadcast network; and
forwarding, by operation of one or more processors, replicated copies of the multicast packet through the crossbar switch to the plurality of output terminals,
wherein forwarding each header of the multicast packet through the broadcast network comprises, for each header of the multicast packet:
upon determining that a header queue of one of the multicast replication buffers corresponding to a crossbar bypass line among the plurality of crossbar bypass lines having a path to a destination output terminal designated in the header is available, facilitating transmission of the header to the corresponding multicast replication buffer, and storing the header in the header queue of the corresponding multicast replication buffer; and
upon determining that the header queue of the one of the multicast replication buffers corresponding to the crossbar bypass line among the plurality of crossbar bypass lines having the path to the destination output terminal is not available, facilitating transmission of the header to a multicast replication buffer among the plurality of multicast replication buffers having a header queue with a lowest backlog, and storing the header in the header queue with the lowest backlog.

6. The method of claim 5, wherein forwarding the payload of the multicast packet through the broadcast network comprises facilitating a broadcast of the payload to a payload queue of each of the plurality of multicast replication buffers.

7. The method of claim 5, wherein the crossbar connects each input among a plurality of inputs of the crossbar switch to each output among a plurality of outputs of the crossbar switch, and wherein each of the plurality of crossbar bypass lines connects a single input among the plurality of inputs to a single output among the plurality of outputs.

8. The method of claim 5, further comprising:
forwarding data via the crossbar in parallel with a replicated copy of the multicast packet forwarded via a crossbar bypass line among the plurality of crossbar bypass lines.

9. A method of routing data to a plurality of output terminals via an integrated switch router, wherein the integrated switch router comprises a broadcast network, a crossbar switch having a crossbar and a plurality of crossbar bypass lines, and a plurality of multicast replication buffers communicatively connected to the broadcast network, wherein each of the plurality of multicast replication buffers respectively corresponds to one of the plurality of crossbar bypass lines, and wherein the method comprises:
receiving a multicast packet from an input terminal;
forwarding a payload of the multicast packet through the broadcast network;
forwarding each header of the multicast packet through the broadcast network; and
forwarding, by operation of one or more processors, replicated copies of the multicast packet through the crossbar switch to the plurality of output terminals,
wherein forwarding replicated copies of the multicast packet through the crossbar switch to the plurality of output terminals comprises, for each header of the multicast packet:
facilitating replication of a copy of the multicast packet at the multicast replication buffer at which the header is stored;
upon determining that the multicast replication buffer at which the header is stored corresponds to a crossbar bypass line among the plurality of crossbar bypass lines having a path to a destination output terminal designated in the header, facilitating transmission of the replicated copy to the destination output terminal via the corresponding crossbar bypass line; and
upon determining that the multicast replication buffer at which the header is stored does not correspond to a crossbar bypass line among the plurality of crossbar bypass lines having a path to the destination output terminal, facilitating transmission of the replicated copy to the destination output terminal via the crossbar.

10. The method of claim 9, wherein forwarding the payload of the multicast packet through the broadcast network comprises facilitating a broadcast of the payload to a payload queue of each of the plurality of multicast replication buffers.

11. The method of claim 9, wherein the crossbar connects each input among a plurality of inputs of the crossbar switch to each output among a plurality of outputs of the crossbar switch, and wherein each of the plurality of crossbar bypass lines connects a single input among the plurality of inputs to a single output among the plurality of outputs.

12. The method of claim 9, further comprising:
forwarding data via the crossbar in parallel with a replicated copy of the multicast packet forwarded via a crossbar bypass line among the plurality of crossbar bypass lines.

\* \* \* \* \*